United States Patent
Skawski, Jr.

(10) Patent No.: US 10,280,569 B2
(45) Date of Patent: May 7, 2019

(54) GOLF COURSE MODULAR BUNKER PAVER BLOCKS

(71) Applicant: George John Skawski, Jr., Macungie, PA (US)

(72) Inventor: George John Skawski, Jr., Macungie, PA (US)

(*) Notice: Subject to any disclaimer, the term of this patent is extended or adjusted under 35 U.S.C. 154(b) by 0 days.

(21) Appl. No.: 15/464,629

(22) Filed: Mar. 21, 2017

(65) Prior Publication Data

US 2017/0191229 A1 Jul. 6, 2017

Related U.S. Application Data

(62) Division of application No. 13/764,994, filed on Feb. 12, 2013, now Pat. No. 9,604,110.

(60) Provisional application No. 61/598,558, filed on Feb. 14, 2012.

(51) Int. Cl.
| | |
|---|---|
| *E01C 3/00* | (2006.01) |
| *E01C 3/06* | (2006.01) |
| *A63B 57/50* | (2015.01) |
| *E01C 13/02* | (2006.01) |
| *E01C 13/04* | (2006.01) |

(52) U.S. Cl.
CPC ............. *E01C 13/02* (2013.01); *A63B 57/50* (2015.10); *E01C 3/006* (2013.01); *E01C 3/06* (2013.01); *E01C 13/045* (2013.01); *E01C 2201/14* (2013.01); *E01C 2201/20* (2013.01); *E01C 2201/202* (2013.01); *E01C 2201/205* (2013.01)

(58) Field of Classification Search
CPC ........ E01C 13/02; E01C 13/045; A63B 57/50
See application file for complete search history.

(56) References Cited

U.S. PATENT DOCUMENTS

| | | |
|---|---|---|
| 567,985 A | 9/1896 | LeClair |
| 691,434 A | 1/1902 | Barnett |
| 1,257,144 A | 2/1918 | Stanwood |
| 4,523,755 A | 6/1985 | Turba |
| 4,749,302 A | 6/1988 | DeClute |

(Continued)

FOREIGN PATENT DOCUMENTS

| | | |
|---|---|---|
| BE | 895292 | 3/1983 |
| FR | 2563251 | 10/1985 |

OTHER PUBLICATIONS

Webpage Download, LastiSeal2007, 2007, www.radonseal.com/concrete-sealter/lastiseal.htm, 5 pages.

(Continued)

*Primary Examiner* — Michael D Dennis
(74) *Attorney, Agent, or Firm* — Wendy W. Koba

(57) ABSTRACT

A golf course bunker drainage system has been developed that is a modular structure taking the form of a plurality of porous bunker paver blocks formed of material exhibiting vertical and horizontal infiltration rates at least the same as bunker sand. The plurality of porous bunker paver blocks is disposed as a boundary layer between a bunker subsoil bottom surface and overlying bunker sand, allowing rainwater to drain into the subsoil, with excess rainwater directed away from the bunker sand. The use of bunker paver blocks also maintains the integrity of the bunker shape and prevents movement of sand and other materials along steeply sloping bunker sidewalls.

6 Claims, 4 Drawing Sheets

(56) References Cited

U.S. PATENT DOCUMENTS

| | | | |
|---|---|---|---|
| 5,234,738 A * | 8/1993 | Wolf | E01C 5/18 404/32 |
| 5,250,340 A | 10/1993 | Bohnhoff | |
| 5,848,856 A | 12/1998 | Bohnhoff | |
| 6,451,400 B1 | 9/2002 | Brock et al. | |
| 6,863,477 B2 | 3/2005 | Jenkins et al. | |
| 7,344,340 B2 | 3/2008 | Carlson et al. | |
| 7,571,572 B2 | 8/2009 | Moller, Jr. | |
| 8,062,143 B1 | 11/2011 | Meersman | |
| 2003/0082004 A1 | 5/2003 | Wilkerson | |
| 2006/0051161 A1 | 3/2006 | Benson | |
| 2011/0052318 A1 * | 3/2011 | Smith | E01C 5/18 404/73 |
| 2011/0200401 A1 | 8/2011 | Lemons | |
| 2012/0163911 A1 | 6/2012 | Culleton et al. | |

OTHER PUBLICATIONS

Webpage Download, Eurasiarubber, 2009, www.eurasiarubber.com/products_list/&pmcid=99197e0f-a9e8-40fe-a99f-80e965139f8b&comp_stats=comp-FrontProductsCategory_show01-1264506178918.html, 4 pages.

Webpage Download, Icevirtuallibrary, 2010, www.academia.edu/3651988/Using_recycled_tyres_in_concrete_paving_blocks, 14 pages.

Webpage Download, Rubberized Concrete Paving Block—Youtube, 2012, www.youtube.com/watch?v=XkP_XKLRzeQwww., 4 pages.

Webpage Download, Eurasiarubber2, 2009, www.eurasiarubber.com/products_list&pmcid=99197e0f-a9e8-40fe-a99f-80e965139f8b&comp_stats=comp-FrontProductsCategory_show01-1264506178918.html, 2 pages.

Webpage Download, Adhesives2008, 2008, 222.huntsman.com/polyurethanes/a_rubbercrumb_6pg.pdf, 3 pages.

Webpage Download, Sportcrete2008, 2008, www.clandongolf.co.uk/the-course/, 5 pages.

Webpage Download, Gardeners2009, 2009, www.gardeners.com/buy/recycled-rubber-mulch-walkway/37-994.html, 2 pages.

Webpage Download, Homedepot2009, 2009, www.homedepot.com/p/Emsco-16-in-x 16-in-Plastic-Deep-Red-Brick-Pattern-Resin-Payers-12-Pack-2155HD/100662054, 1 page.

Webpage Download, Youtube2009, 2009, www.youtube.com/watch?v=weQMBAHL_9g, 4 pages.

Webpage Download, Youtube2009, 2009, www.youtube.com/watch?v=IJ8zivDHYjE, 6 pages.

Webpage Download, thomasturf2003, 2003, web.archive.org/web/20030618160957/http://www.thomasturf.com/articles/bunkersand.html, 4 pages.

* cited by examiner

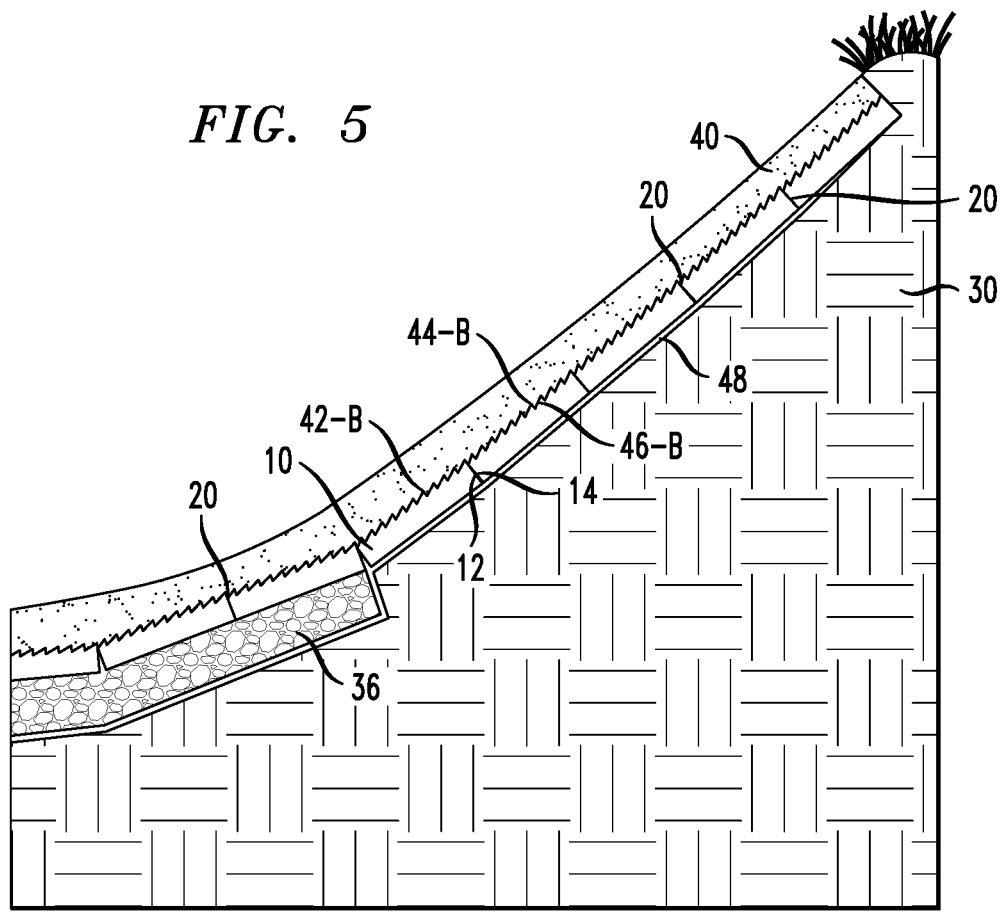

GOLF COURSE MODULAR BUNKER PAVER BLOCKS

CROSS-REFERENCE TO RELATED APPLICATIONS

This application is a divisional of U.S. application Ser. No. 13/764,994, filed Feb. 12, 2013, which claims the benefit of U.S. Provisional Application Ser. No. 61/598,558, filed Feb. 14, 2012, both applications being herein incorporated by reference.

TECHNICAL FIELD

The present invention relates to improvements for golf course bunkers and, more particularly, to the creation and utilization of modular, porous bunker paver blocks to improve the longevity and appearance of sand bunkers.

BACKGROUND OF THE INVENTION

The golf course bunker originated in Scotland and Ireland as a hazard on the golf course (other hazards including rough areas, water, mounds, trees and the like), where these hazards are included in a golf course design as obstacles for strategy and direction, as well as for aesthetic purposes. In its earliest form, the bunker was more of a natural sand pit and was not formally maintained. In time, design styles changed and the bunker became a formalized tool that was utilized by course designers to create unique challenges for golfers. Indeed, most of the great, well-known golf courses include dramatic bunkers, where their styles vary from steep slopes with sand or turf to expansive areas with relatively flat contours.

Contemporary bunker maintenance is a major part of a golf course superintendent's responsibilities. Indeed, the time required to maintain bunkers at their expected high degree of quality can be challenging, particularly on courses that include upwards of a hundred bunkers or more. While maintenance crews spend a certain amount of time repairing bunker damage resulting from golf play, the majority of bunker maintenance is associated with repair from rain events and other environmental causes. Indeed, when a rainstorm occurs, the required repair work on bunkers may be extreme. For example, when a storm event occurs, the sand can be washed from the high spots on bunker slopes to lower regions in the bunker, exposing the subsoil on the slopes. The sand can be contaminated by subsoil color or even become mixed with stone particles that form the lower drainage area of a bunker. Inasmuch as this contamination is almost impossible to remove the sand, the old sand is usually removed and replaced with fresh sand, increasing bunker maintenance costs.

There have been some attempts in the past to address these problems associated with golf course bunker maintenance. In some cases, fabric liners have been installed as a barrier between the subsoil and the bunker sand. However, these liners tend to degrade over time, and are known to have a limited holding capacity, particularly on slopes. Liners are also held in place by metal stakes that may become exposed (especially in northern climates) due to ground freeze/heaving, etc.

Instead of a liner formed of as a sheet of material, other solutions have used spray coatings of a material over the subsoil. In some cases, a concrete spray is used. Again, this material tends to degrade over time and is especially sensitive to the temperature variations associated with northern climates (particularly ground freeze). These coatings are also difficult to repair and minimize the ability of the course to modify the bunker design without totally demolishing the concrete material.

Various types of aggregate materials have also been used as a thin boundary layer between the subsoil and the sand, creating an area with improved drainage and defining a physical boundary between the sand and the subsoil. Aggregates such as a bituminous layer with stone aggregate, polymer spray stone aggregate and rubber-polymer layers with stone aggregate have all been used. Regardless of the material selection, these aggregate structures have been found to have limited holding capacity against steep bunker slopes and tend to move downward over time, thus causing the covering sand to move as well. Again, these aggregate arrangements are difficult to repair and require a total bunker reconstruction if a design change is desired.

Thus, a need remains in the art for an arrangement that provides the drainage characteristics necessary to maintain the longevity and appearance of a golf course bunker, while providing the necessary protection of steep slopes and allowing for bunker design modifications to be accommodated.

SUMMARY OF THE INVENTION

The needs remaining in the prior art are addressed by the present invention, which relates to improvements for golf course bunkers and, more particularly, to the creation and utilization of modular, porous bunker paver blocks to improve the longevity and appearance of sand bunkers.

In accordance with one embodiment of the present invention, golf course bunker drainage system has been developed that is a modular structure taking the form of a plurality of porous bunker paver blocks formed of material exhibiting vertical and horizontal infiltration rates similar to bunker sand. The plurality of porous bunker paver blocks is disposed as a boundary layer between a bunker subsoil bottom surface and overlying bunker sand, allowing rainwater to efficiently drain away from the bunker sand while also maintaining the integrity of the bunker shape and preventing movement of sand and other materials along steeply sloping bunker sidewalls.

The bunker paver blocks are preferably formed to have side and end faces of a form that allows for the blocks to interlock as they are placed next to each other. The top surface of the bunker paver blocks can be textured to promote adherence of the bunker sand to the block, and the bottom surface of the blocks can be textured to help anchor the blocks in place along the bottom surface of a bunker.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 5 is a close-up, cut-away side view of a portion of a sand bunker, formed to include modular paver bunkers with a serrated surface, formed in accordance with the present invention.

DETAILED DESCRIPTION

Figure 1:
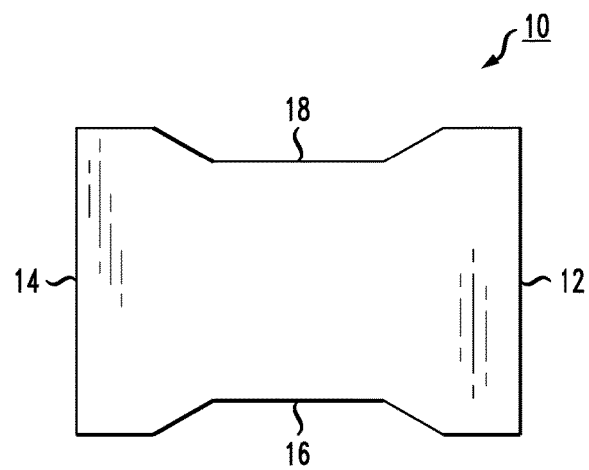
FIG. 1 is a top view of an exemplary bunker paver block 10 formed in accordance with the present invention.

FIG. 1 is a top view of an exemplary bunker paver block 10 formed in accordance with the present invention. Importantly, bunker paver block 10 comprises a pervious or porous material, such vulcanized rubber, plastic or crumb rubber with a binding agent. Acceptable binding agents include polymer adhesives, bituminous asphalt, epoxy-based materials, or the like. New or recycled materials (or a combination thereof) may be used to form the bunker paver blocks, as long as the created bunker paver block exhibits the desired pervious/porous properties. Moreover, any suitable manufacturing process may be used to form the paver blocks and is not considered to be germane to the present invention.

In accordance with the present invention, bunker paver 10 is formed as a pervious or porous structure such that its infiltration rate (both horizontal and vertical) are at least similar to the infiltration rate of the bunker sand overlying the bunker paver. With this property, bunker paver blocks 10 create the drainage properties required for a golf course sand bunker, while the modular nature of the interlocking paver blocks permits them to be arrangement and re-arranged as necessary as bunker designs are modified.

Continuing with reference to FIG. 1, bunker paver 10 is illustrated as including a pair of opposing end faces 12, 14 and a pair of opposing side faces 16, 18. In a preferred embodiment of the present invention, the topology of bunker 10 as defined by faces 12, 14, 16 and 18 is designed to allow for adjacent bunker paver blocks to interlock in a manner that allows for the overall plurality of bunker paver blocks to hold each other in place.

Figure 2:
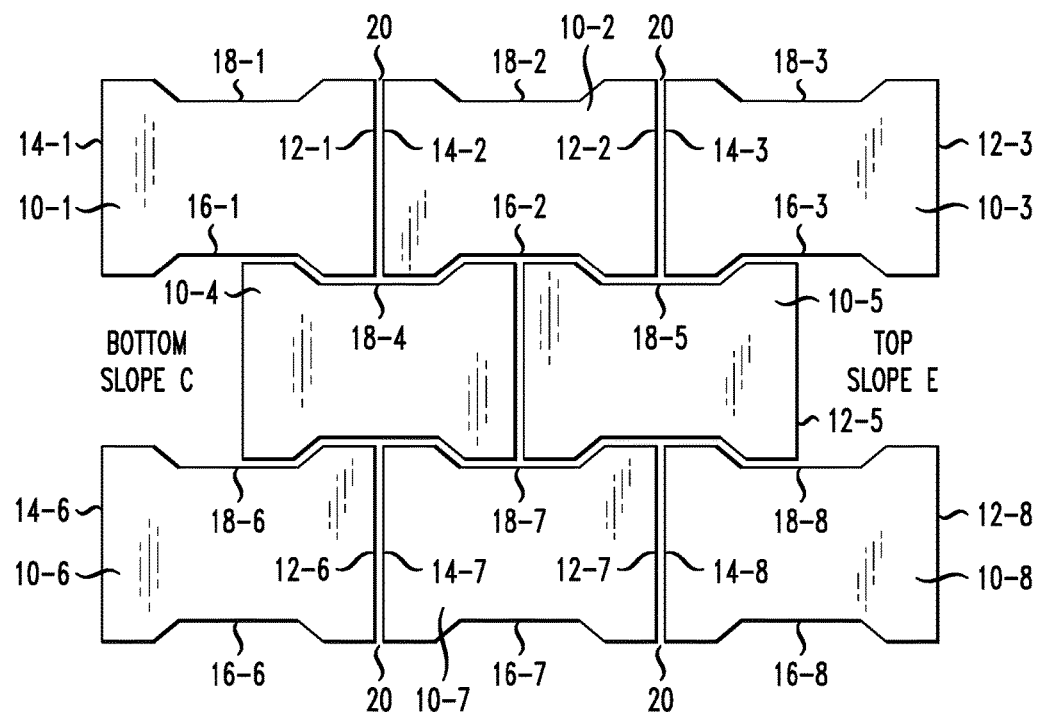
FIG. 2 is a top view of a plurality of bunker paver blocks, as disposed in an interlocking arrangement, as may be used within a golf course sand bunker.

FIG. 2 is a top view of a plurality of bunker paver blocks, as disposed in an interlocking arrangement, as may be used within a golf course bunker. As shown, a top "row" of bunker paver blocks 10-1, 10-2 and 10-3 are disposed adjacent to one another, with end face 12-1 of bunker paver block 10-1 positioned adjacent to end face 14-2 of bunker paver block 10-2. Similarly, end face 12-2 of bunker paver block 10-2 is positioned adjacent to end face 14-3 of bunker paver block 10-3. For the sake of example, it is presumed that end face 14-1 of bunker paver block 10-1 is disposed towards the center C of an associated bunker (not shown), with the paver blocks then positioned against an upwardly sloping wall of a bunker, with bunker paver block 10-3 positioned towards an upper edge E of the bunker.

A second row of bunker paver blocks is shown as interlocking with the first row as described above. In particular, side face 18-4 of bunker paver block 10-4 is shown as positioned to mate with a right-hand half of side face 16-1 of bunker paver block 10-1 and a left-hand half of side face 16-2 of bunker paver block 10-2, similar to a brick laying pattern. A second bunker paver block 10-5 of the second row is shown as interlocking in a similar fashion with bunker paver blocks 10-2 and 10-3. A third row of bunker paver blocks 10-6, 10-7 and 10-8 is also shown in FIG. 2 as interlocking with the pair of bunker paver blocks 10-4 and 10-5 of the second row.

The topology of the side faces of bunker paver blocks 10 is shown to provide this interlocking to provide mechanical stability to the combination paver blocks forming the bunker drainage system. This mechanical stability will allow for the bunker paver blocks to remain in place, particularly along steep sloping sidewalls, overcoming a major problem associated with various prior art arrangements. When bunker sand is then placed over the plurality of bunker paver blocks, the additional weight will further provide mechanical stability, with some of the sand working into the interfaces between adjacent paver blocks and provide further rigidity to the interlocking structure.

An added benefit of the arrangement of the present invention is that by virtue of utilizing a plurality of modular bunker paver blocks, a natural microdrain channel 20 will be formed at the edges where paver blocks abut one another. Microdrain channels 20 provide additional paths for drainage of rain from the bunker. These additional microdrain channels are not found in prior art, unitary bunker liners.

Figure 3:
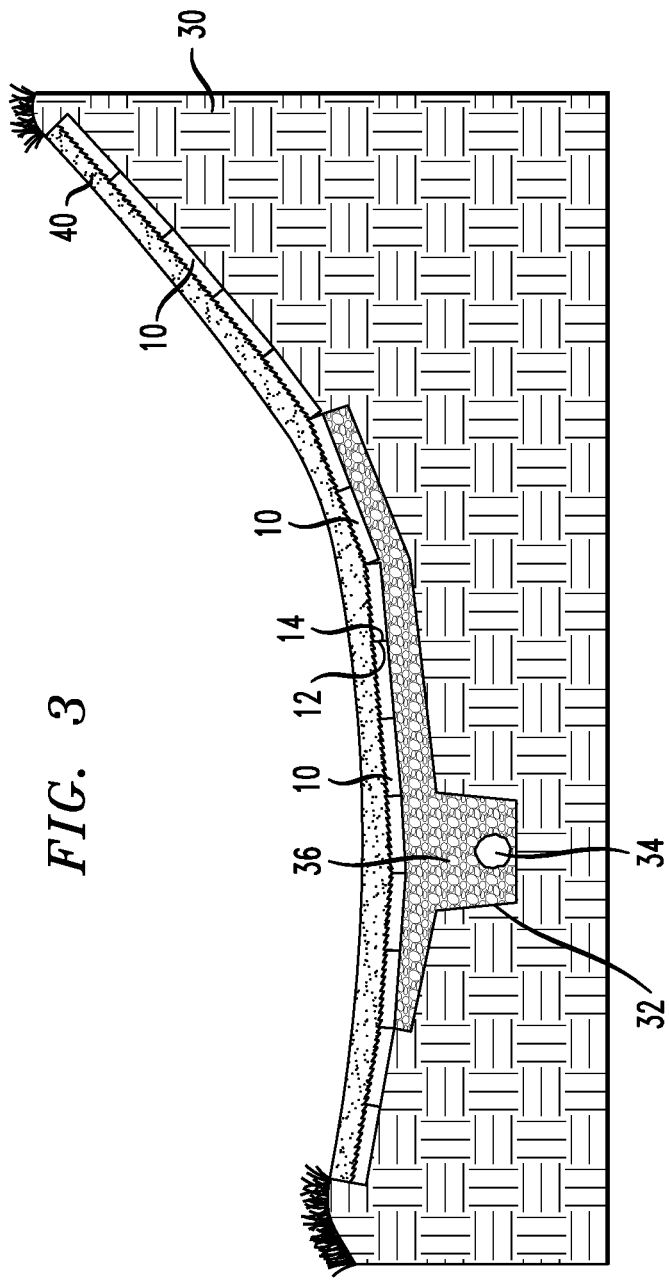
FIG. 3 is a cut-away side view of an exemplary golf course sand bunker, illustrating the placement of the bunker paver blocks of the present invention with respect to the other components of a typical bunker.

FIG. 3 is a cut-away side view of an exemplary golf course sand bunker, illustrating the placement of the bunker paver blocks of the present invention with respect to the other components of a typical sand bunker. As shown, a sand bunker is formed by creating a hollowed region of a desired contour in a portion of native soil (or subsoil) 30. A drainage area 32 is formed at the lowest natural portion of the contour, and a drainage pipe 34 is disposed in drainage area 32. While not always used, an additional drainage layer 36 of aggregate stone (or other suitable material) may be disposed across an area of the exposed bunker in the region of drainage area 32.

In accordance with the present invention, a plurality of bunker paver blocks 10 is then positioned over subsoil 30 (or drainage layer 36, if used), where the individual, modular bunker paver blocks are placed within the bunker in the interlocking pattern as shown in FIG. 2. Beyond the porous nature of the block material itself, microchannel drains 20 at the interface between adjacent blocks 10 also assist in quickly and efficiently draining water from the bunker sand. Bunker sand 40 is then placed over the positioned bunker paver blocks 10. Clearly, the inclusion of modular bunker paver blocks 10 provides a boundary between bunker sand 40 and subsoil 30, preventing the sand from being contaminated by the subsoil. This same protection as provided by modular bunker paver blocks 10 prevents any aggregate material of layer 36 from infiltrating the bunker sand.

Figure 4:
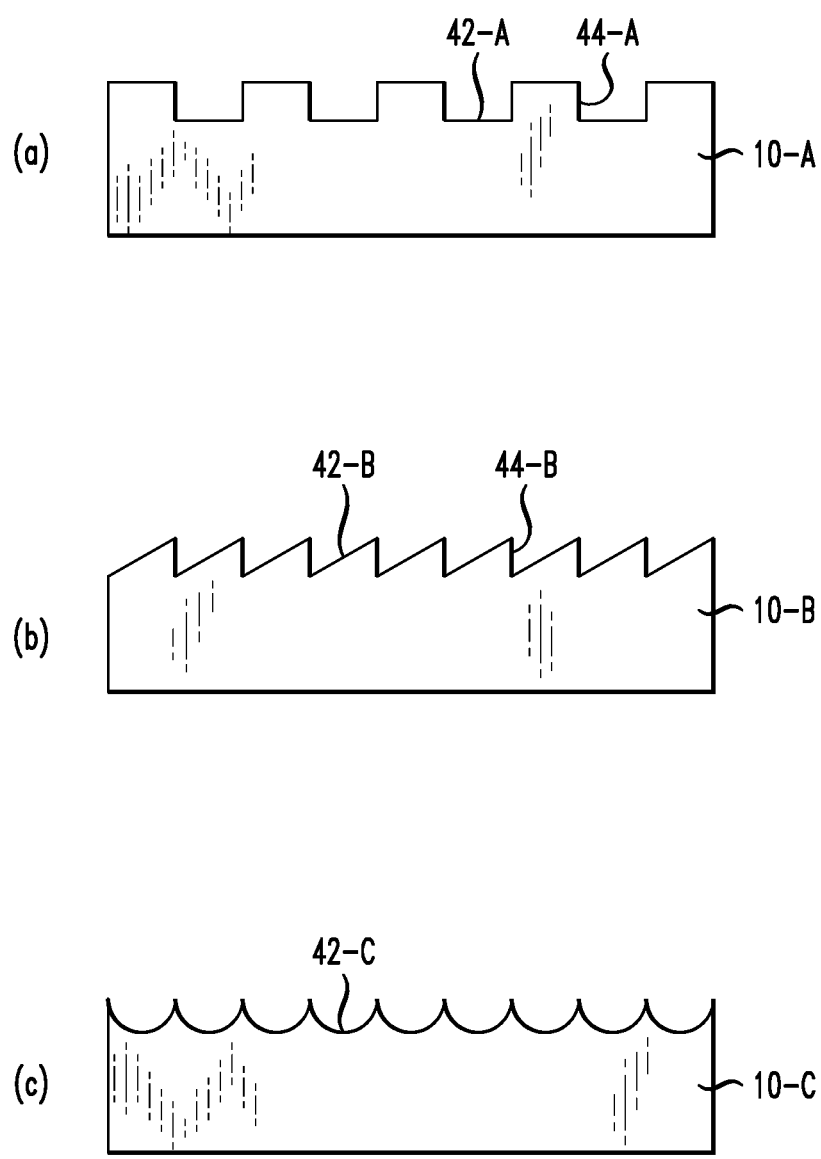
FIG. 4 is a cut-away side view of a set of three bunker paver blocks, illustrating different types of textured top surfaces useful for binding bunker sand thereto.

In one exemplary embodiment, a bunker paver of the present invention may be formed to include a rough or corrugated top surface. This feature has been found to stabilize the sand overlying the paver and hold the sand in place, particularly on bunker slopes. FIG. 4 is a cut-away side view of a set of three bunker paver blocks 10-A, 10-B and 10-C, each exhibiting a different textured top surface 40 useful for adhering sand to the paver blocks. It is to be understood that the forms shown in FIG. 4 are exemplary only and various other roughened topologies may be formed on a bunker paver top surface in accordance with the teachings of the present invention.

Referring to FIG. 4, bunker paver 10-A is shown as having a top surface 42-A which illustrates a squared-off corrugation. The accumulation of sand within trenches 44-A will assist in helping the sand particles to remain in contact with each other and minimize the movement of sand on bunker slopes.

Bunker paver 10-B is shown as including a serrated top surface 42-B. In this case, the placement of bunker paver blocks 10-B in a bunker such that edges 44-B point upward (towards the edge of the bunker) so as to allow for sand to naturally collect in each section. Again, this particular arrangement include a serrated top surface of a bunker paver, prevents movement of bunker sand (particularly on slopes). Bunker paver 10-C is shown as having a top surface 42-C of a scalloped design, creating indented areas for sand accumulation.

FIG. 5 is a close-up, cut-away side view of a portion of a sand bunker, formed to include modular paver bunkers with a serrated surface, formed in accordance with the present invention. As shown, a set of modular bunker paver blocks 10 is positioned across the bottom surface of the bunker, covering both subsoil 30 and drainage aggregate 36. Adjacent bunker paver blocks 10 are disposed in an interlocking pattern (as shown in FIG. 2, for example), with an exemplary end edge 12 of a first bunker paver positioned against an end edge 14 of an adjacent bunker. Microdrain channels 20 are evident in this view.

As described above, the plurality of modular bunker paver blocks 10 shown in FIG. 5 are formed to include serrated top surface 42-B. Bunker paver blocks 10 are positioned with edges 44-B pointing upwards, allowing for bunker sand to accumulate in regions 46-B. By accumulating sand in this manner, the possibility of sand releasing from sloping bunker sidewalls is greatly reduced. In the particular embodiment as shown in FIG. 5, bottom surface 48 of bunker paver blocks 10 is also roughened, where this additional texture on bottom surface 48 assists in fixing blocks 10 in place against the subsoil (and/or aggregate material) on the bottom of an associated bunker.

By virtue of using modular bunker paver blocks in accordance with the present invention, the limitations of the prior art solutions are overcome and various advantages become apparent. In particular, the interlocking arrangement of modular paver blocks creates a mechanical force that holds the arrangement in place, minimizing the possibility of bunker damage along sloping sidewalls (as well as the release of sand from these sidewalls).

The modular paver blocks are preferably sized so that an individual may perform their placement arrangement without needing other assistance. If necessary, the bunker paver blocks may be cut to properly fit along the edges of a sand bunker or modify internal paver block angles. Moreover, if an individual bunker paver becomes somehow damaged or breaks, the maintenance personnel need only remove the damaged paver block and replace it, leaving the rest of the bunker paver blocks undisturbed.

In situations where it is desired to modify the design of a bunker, the uncovered bunker paver blocks can be removed, realigned, etc. in order to change the particular bunker design. The modularity also allows for the various paver blocks to slightly move as the ground underneath the bunker heaves during freezing and warming conditions, absorbing this movement without causing the overall bunker integrity to be compromised.

Although only some preferred embodiments of the invention have been described in detail above, those skilled in the art will readily appreciate that many modifications are possible in the preferred embodiments without departing from the advantages of the present invention. Accordingly, all such modifications are intended to be included within the scope of the present invention.

What is claimed is:

1. Apparatus for use in improving water drainage in a golf course bunker, the apparatus comprising
a plurality of porous bunker paver blocks formed of material exhibiting vertical and horizontal infiltration rates, wherein said plurality of porous bunker paver blocks are disposed as an intermediate boundary layer between a bunker subsoil bottom surface and a bunker sand top surface, wherein said plurality of porous bunker paver blocks permit water collecting on the bunker sand to drain through the plurality of porous bunker paver blocks and into the bunker subsoil bottom surface.

2. Apparatus as defined in claim 1 wherein the porous bunker paver block is formed of a rubber material.

3. Apparatus as defined in claim 2 wherein the bunker paver block is formed of a vulcanized rubber material.

4. Apparatus defined in claim 1 wherein the bunker paver block is formed of a crumb rubber in combination with a binding agent.

5. Apparatus as defined in claim 1 wherein a top surface of the bunker paver block is textured to maintain overlying bunker sand in place on the top surface.

6. Apparatus as defined in claim 1 wherein a bottom surface of the bunker paver block is textured so as to grip onto the bunker subsoil bottom surface.

\* \* \* \* \*